Patented Jan. 27, 1942

2,271,499

UNITED STATES PATENT OFFICE 2,271,499

WATER-TREATING COMPOUND

Cyrus W. Rice, Pittsburgh, Pa.

No Drawing. Application June 15, 1940,
Serial No. 340,777

3 Claims. (Cl. 252—180)

This invention relates to water-treating compounds adapted to the treatment of water which is heated in steam generating boilers or water heaters. The general purpose of my invention is to provide a boiler compound capable of inhibiting the formation of scale and adherent sludge in boilers and water heaters. The application herein is a continuation-in-part of my applications Serial No. 182,809, filed December 31, 1937, now Patent No. 2,258,260, issued October 7, 1941 and Serial No. 141,726, filed May 10, 1937.

Various methods of inhibiting formations in boilers and heaters which result through depositions of salts that are insoluble under the conditions existing in most heating instrumentalities, have been proposed and employed. The preponderant scale-forming elements present in all waters are calcium and magnesium, which tend under boiler conditions to form insoluble precipitates having the quality of encrusting the surfaces upon which they are deposited. Silica, on the other hand, while present in proportionally much smaller quantities in most water supplies, proves by far the most troublesome water constituent because of its quality of forming dense and adherent encrustations, and the property it possesses of cementing chemical precipitates or sludges into hard masses; all of which influences have a direct bearing on boiler repairs and cleaning costs.

My invention relates to a type of treatment in which the inorganic scale-forming and cementing constituents normally present in water react chemically with certain proteins in the formation of salt-like crystalloids, which remain in intimate suspension in the water in its passage through the water-heating and feeding equipment of a boiler, and within the circulating waters within boilers themselves, until the crystalloid bodies are removed to waste through means provided for the purpose.

The present practices in use for conditioning boiler feed waters with commercial chemicals, under the best sorts or treatment control, result in more or less deposition of objectionable sludge materials within water-carrying and heating equipment, and boilers.

Supplemental treatments employing starches are beneficial in this connection, but have proven uncertain in their effects. This is largely because they function merely mechanically in preventing hard sludge formation, and because of the destructive action soda concentrations and temperature within boilers have on the starches.

By using compounds in accordance with my invention, the intimate chemical reaction between reacted proteins of the kind employed and scale-forming and cementing constituents in waters, with resultant formation of amorphous crystalloid compounds, I provide greater protection against hard scale and sludge formations than it is possible to obtain by the mechanical effects of starch, or similar colloid-producing materials, or by any straight treatment with inorganic chemicals.

The proteins which I employ react chemically with calcium, and magnesium in the formation of calcium and magnesium protein compounds, and have also ability to react with silica.

Being crystalloid, the bodies formed by reaction of each of the scale-forming ingredients with the protein compounds has a specific solubility in water, and the lesser solubility of calcium, magnesium and silica causes these reaction products to exist as colloids with high dispersion value. This gives a control in the conditioning of feed waters that definitely eliminates the possibility of troublesome scale and sludge formations within water heating instrumentalities and in the connections thereto, and permits the scale-inhibiting material to be introduced satisfactorily in the feed water which passes to a boiler. It thus has a general advantage over purely inorganic materials, in that its crystalloid nature, and the crystalloid nature of its reaction products, accommodates it to the free circulation of water in which it is included.

Briefly to indicate my invention, I have discovered that suitably reacted proteins are capable of maintaining in a body of water a reactive and adsorptive colloidal dispersion, and that by reaction with calcium and magnesium (also with iron and other metals) such colloidal reagents do not lose their crystalloid character. On the contrary, the compounds which are formed by reaction of the substances commonly found in boiler water with a protein compound such as I employ are crystalloid and not scale-forming. They are effectively eliminated to waste by boiler blowdowns, or other modes in which freely suspended matter may be removed from a containing vessel.

I have recognized that many types of proteins which may be exemplified by casein, glycinin, cottonseed protein, and gluten are remarkably alike, being almost identical in carbon, hydrogen, oxygen, nitrogen, sulphur, and phosphorous content. They are amphoteric and acquire the ability to form stable colloidal solutions when suitably reacted. In preparing my boiler compound, I react the proteins with an acid which, under suitable conditions, will form a stable combination with the protein rather than breaking down the protein into amino acids. Thus, I have found that I may react the amphoteric proteins, such as casein, glycinin, gluten, and cottonseed protein with acids, such as phosphoric acid, lactic acid and citric acid to form stable protein compounds of those acids. Acids such as sulphuric acid, nitric acid, and hydrochloric acid are not suitable in making my boiler compound, for the reason that they cannot be controlled in reaction with a protein to give the desired stable protein compound.

In reacting the proteins with acids suitable for the purpose of producing protein compounds which are stable as produced, and under boiler conditions, care should be taken that the reaction conditions are controlled. This is in order to avoid the above-noted decomposition into amino acids which are far less effective in boiler water treatment than the salt-like gels typical of the stable reaction products of proteins and the acids.

The following examples will illustrate suitable reactions producing the colloidal material which I use in water treatment:

Example No. 1

| | Parts by weight |
|---|---|
| Commercial orthophosphoric acid (70% $H_3PO_4$) | 70 |
| Glycinin | 30 |

These materials are mixed together with agitation to produce a glycinin phosphate, which is a gelled product of the reaction. The reaction will take place at room temperature, without the application of heat.

In effecting a straight reaction of a protein, such as the above-noted reaction, between glycinin and orthophosphoric acid of the given $H_2PO_4$ value, the protein reacted should not be substantially less than 25% by weight of the reaction mixture, as the water content of orthophosphoric acid tends to break down the glycinin into amino acids, which are much less desirable for water conditioning purposes. The 70% $H_3PO_4$ value of the orthophosphoric acid is given as exemplary because that is the approximate value of a usual and desirable commercial acid. It is therefore the water content of the orthophosphoric acid which determines the proportion of protein which it is necessary to react with the phosphoric acid, greater $H_3PO_4$ value of the acid requiring a lower proportion of a protein, and vice versa.

In the use of lactic acid in the production of my water conditioning agent with glycinin I find that almost any concentration of the acid may be employed without apportioning the percentage of the protein, as for example:

Example No. 2

| | Parts by weight |
|---|---|
| 85% lactic acid | 56 |
| Glycinin | 44 | is as effective in this conversion to the desired colloid as is a mixture of

| | Parts by weight |
|---|---|
| 22% lactic acid | 70 |
| Glycinin | 30 |

It should be explained that in the case of phosphoric acid, the problem involved is due to the water content of the acid. If there be present during the reaction a water-absorbing substance, such as starch, it is possible to use phosphoric acid in larger quantities and in a lesser concentration than has been given. The presence of starches, or other water-absorbing substance which suitably may be included in a boiler compound, inhibits decomposition of the reaction products of the proteins and phosphoric acid into the undesired amino acids. When starch is used as the water-absorbent material, any excess of phosphoric acid tends by reaction with the starch to form dextrin which is itself a valuable boiler-conditioning substance. The above requirements as to proportions of protein and phosphoric acid and the concentration of acid should therefore be taken with the provision that the use of water-absorbent substances during the reaction, either starch, or starch-like material, which may suitably become a part of the compound, or a material which may be separated from the reaction products, such as clay, greatly broadens the range of both proportion and concentration.

It should, however, be understood that in the absence of a water-absorbent during the reaction by which the boiler compound is produced, the less the $H_3PO_4$ value of the phosphoric acid used for the reaction, the greater should be the proportion of protein with respect to the acid, in order so to control conditions that decomposition into amino acids is avoided. In the use of citric acid as well as lactic acid, the problem of decomposition is less exacting. The use of phosphoric acid as the reagent does, however, give certain specific advantage, since its inclusion in a protein compound imparts to that compound the recognized properties of a phosphate in maintaining favorable condition within a boiler or water heater.

It is to be understood that mixtures of proteins may suitably be subjected to reaction in making my water-conditioning compounds, or a plurality of separately reacted proteins may be mixed for use. This is true of gluten, which is less dispersible in hot water, and which may desirably be mixed with another protein, such as glycinin, for the solubilizing and stabilizing reaction.

As exemplary of a reaction with mixed proteins, we may give the following:

Example No. 3

| | Parts by weight |
|---|---|
| Commercial orthophosphoric acid (70% $H_3PO_4$) | 70 |
| Glycinin | 15 |
| Gluten | 15 |

These materials were mixed together with agitation to produce a mixed mass of glycinin phosphate and gluten phosphate as a gelled product of the reaction. The reaction will take place at normal room temperature, without the application of heat.

Inhibition to the deposit of silicates is also effected by the reacted proteins, and by the reaction products which they form with the main scale-forming radicals in the boiler water. In the boiler or water-heater the colloidal solution of reacted protein reacts with scale-forming radicals to produce a variety of crystalloid compounds, such as calcium glycinate, magnesium glycinate, calcium magnesium glycinate, calcium magnesium phosphate, magnesium glycinin phosphate, calcium magnesium glycinin phosphate, glycinin silicate. Glycinin lactate and glycinin citrate as exemplary of the stable reacted proteins in that they tend to react with calcium and magnesium and in measure with silicon to form crystalloid bodies. None of the products of such colloidal reactions are capable of cemented deposition to form hard sludge masses either in feed water heaters, in water-feeding equipment, or in boilers. On the contrary, being themselves crystalloids, they tend on agglomeration to remain in suspension in the water or to be precipitated in the form of a soft sludge which may readily be removed from the boiler by blowing it down.

The stable reacted proteins thus initially react with calcium, magnesium and silica to prevent the formation and deposition of scale-forming compounds of those radicals, and also persistently act mechanically and adsorptively to prevent the scale-forming deposition of silicates. They thus perform a useful and continuing function following their initial reactive function in the boiler, and permit starch to be minimized in, or omitted from the boiler water, with simplification of boiler conditions while nonetheless adequately inhibiting a scale-forming deposition of silicates.

Desirable mixtures of amphoteric metallic substances, such as zinc and aluminum, may be made with the acid-reacted proteins, and have equal effect in introducing desirable amorphous crystalloid compounds in boiler waters. Examples of such mixtures may be given as follows:

Example No. 4

Parts by weight
Commercial orthophosphoric acid (70% $H_3PO_4$) _____ 70
Glycinin _____ 20
Finely divided metallic zinc_____ 5

The reaction product is gelled to a solid state and consists of zinc acid glycinate, or glycinin acid zinc phosphate.

Example No. 5

Parts by weight
Commercial lactic acid (85% concentration) _ 56
Glycinin _____ 40
Finely divided metallic zinc_____ 4

These materials also may be mixed together at normal room temperature with agitation to give the gelled reaction product. The products containing zinc or aluminum possess the same general properties as do the simple acid-reacted proteins. I have found that zinc, or its equivalent aluminum, performs a variety of functions in making up the water-conditioning compound. For example in the initial gel-forming reaction it acts as a retardant, reducing the activity of the acid, such as orthophosphoric acid, in decomposing the protein to components of the amino acid group.

While the examples including zinc and aluminum have described the reaction of these metals in their metallic state, they may be included in the reaction mixture in the form of their salts or bases, such as aluminum chloride, zinc chloride, aluminum hydroxide and zinc hydroxide. It should, however, be borne in mind that without the addition of these metals the treating compound in its simpler form, such as glycinin phosphate, or glycinin lactate, is capable of reacting with silica, calcium and magnesium, to inhibit the deposition of these materials within the feed water heating and feeding equipment, and boilers.

With the proportions above given in the various examples so that the colloidal reaction product is in the solid state, it may desirably be reacted with a suitable alkaline reagent, such as a compound of sodium, potassium or ammonium in water solution prior to its introduction into water in, or passing to, a boiler or water heater. The resultant product, such as sodium glycinin phosphate or sodium zinc glycinin phosphate forms in the water a true colloidal solution, and is, therefore, capable of being passed through the water connections without inhibiting any tendency to ball up and to clog valves or orifices through which water may be passed.

If, in reacting to form the water-treating compound the proportions be varied from these given above so that the proportion of acid to protein is carefully increased, the product is a heavy liquid colloid, rather than a solid rubber-like mass. This is particularly true if zinc or aluminum is not included in the reaction mixture. If however, the proportion of acid with respect to protein is not excessive, the product (assuming that lactic acid be used) is nonetheless fundamentally a gel, capable of forming with water a colloidal solution, or fine colloidal dispersion stable under boiler conditions and capable of effecting the desired reactions in a boiler or water heater. It is desirable to produce a treating compound in solid form, because it may in that form be conveniently shipped and stored. It is desirable, as above noted, to react the compound with alkalinity due to sodium, potassium, or ammonium, before introducing it into the boiler water, unless there be present in the boiler water a substantial alkaline concentration. This is in order to insure against causing a corrosive effect in the boiler.

It should be borne in mind that a great advantage resides in the type of product produced by reaction of any variant of my treating compounds with such radicals as calcium, magnesium, silica, iron, and the like, in the boiler water because the products are all of a nature to remain suspended in the water, and are, therefore, readily removed by blowdowns to waste. This results in reduced carryovers and better steam qualities. Whether the boiler reactions are true chemical reactions, or whether they tend rather to be physical reactions of adsorptive kind, or tend to the formation of aggregates and micelles, it is a fact that the reacted proteins serve both initially and persistently to prevent scale-forming deposition of calcium and magnesium, and the cementing action of silicates. Small quantities of the reacted proteins have proven highly effective in destroying the cementing action of silicates in the complex and highly variant scale-formations they tend to make with calcium, magnesium, sodium, aluminum and iron.

I claim as my invention:

1. A water-treating compound for boilers and water heaters consisting essentially of a proteinate which is the reaction product of a protein selected from the group consisting of casein, glycinin, gluten, and cottonseed protein with an acid selected from the group consisting of phosphoric acid, lactic acid, and citric acid, and a metal selected from the group consisting of zinc and aluminum, the said water-treating compound being substantially free of amino decomposition products of the reacted protein.

2. A water-treating compound for boilers and water heaters consisting essentially of a protein phosphate which is the reaction product of glycinin with phosphoric acid, the said water-treating compound being substantially free of amino decomposition products of the reacted protein.

3. A water-treating compound for boilers and water heaters consisting essentially of gluten phosphate which is the reaction product of gluten with phosphoric acid, the said water-treating compound being substantially free of amino decomposition products of the reacted protein.

CYRUS W. RICE.